United States Patent [19]

Hiraga et al.

[11] Patent Number: 5,509,116
[45] Date of Patent: Apr. 16, 1996

[54] GRAPHICAL USER INTERFACE MANAGEMENT SYSTEM

[75] Inventors: Rumi Hiraga, Matsudo; Yeong-chang Lien, Tokyo, both of Japan

[73] Assignee: International Business Machines Corporation, Armonk, N.Y.

[21] Appl. No.: 328,973

[22] Filed: Oct. 24, 1994

Related U.S. Application Data

[63] Continuation of Ser. No. 676,602, Mar. 28, 1991, abandoned.

[30] Foreign Application Priority Data

Mar. 30, 1990 [JP] Japan .................................. 2-081474

[51] Int. Cl.⁶ .................................................... G06F 15/00
[52] U.S. Cl. .................................................... 395/155
[58] Field of Search .................................. 395/155, 156, 395/161; 345/115, 116

[56] References Cited

U.S. PATENT DOCUMENTS

| | | | |
|---|---|---|---|
| 4,736,340 | 4/1988 | Desserrigres et al. | 364/900 |
| 5,191,646 | 3/1993 | Noyto et al. | 395/161 |
| 5,208,907 | 5/1993 | Shelton et al. | 395/149 |
| 5,211,564 | 5/1993 | Martinez et al. | 434/323 |
| 5,220,675 | 6/1993 | Padawer et al. | 395/800 |
| 5,233,688 | 8/1993 | Too | 395/161 |
| 5,276,791 | 1/1994 | Palmer | 395/146 |
| 5,278,951 | 1/1994 | Camacho et al. | 395/140 |
| 5,287,439 | 2/1994 | Koga et al. | 395/133 |
| 5,295,244 | 3/1994 | Dev et al. | 395/161 |
| 5,305,434 | 4/1994 | Ballard et al. | 395/155 |

FOREIGN PATENT DOCUMENTS 1-229321  9/1989  Japan .

OTHER PUBLICATIONS

"A User Interface Toolkit Based on Graphical Objects and Constraints", P. Szekely and B. Myers, OOPSLA '88 Proceedings Sep. 25–30, 1988.

Primary Examiner—Phu K. Nguyen
Attorney, Agent, or Firm—Mark E. McBurney; Thomas E. Tyson; Andrew J. Dillon

[57] ABSTRACT

An information handling system manages the interaction between a graphical user interface and a program application. Procedural modules which define operations to be executed by the program application to implement specific functions are stored in a relational data table. Graphical objects such as polygons, rectangles, squares, arrows and other objects are stored in the relational data table. A menu driven system allows a user to associate or link, specific graphical objects with procedural modules such that when the graphical object is selected by a user through a mouse click operation, or the like, the program applications executes operations corresponding to the procedural modules associated with graphical objects selected. In this manner, a user can manage an object oriented system by relating various graphical objects to desired procedural modules to be executed by the program application.

12 Claims, 11 Drawing Sheets

| | 113a | 113b | 113c | 113d |
|---|---|---|---|---|
| A | WINDOW HANDLE | MESSAGE | TIMESTAMP | PARAMETERS... |

| | | | | | | | |
|---|---|---|---|---|---|---|---|
| | 11 | MU_INVOKEAP | | ' MONTHLY SALES TABLE ' | | | |
| | 10 | MU_LOCATE | ------- | 545 | 474 | 932 | 624 |
| | 10 | WM_1BUTTONUP | 0.000 | 836 | 442 | 0 | 0 |
| | 10 | WM_1BUTTONDOWN | 0.940 | 784 | 514 | 0 | 0 |
| | 10 | WM_1BUTTONUP | 0.220 | 784 | 514 | 0 | 0 |
| B | 10 | WM_MENUSELECT | 1.680 | 12 | ---- | 9 | 2a |
| | 12 | MU_INVOKEAP | | ' MONTHLY SALES GRAPH ' | | | |
| | 13 | MU_LOCATE | ------- | 625 | 80 | 418 | 264 |
| | 13 | WM_1BUTTONUP | 0.000 | 752 | 20 | 0 | 0 |
| | 13 | WM_MENUSELECT | 2.030 | 13 | ---- | 2 | 12 |
| | 13 | WM_1BUTTONDOWN | 1.840 | 646 | 110 | 0 | 0 |
| | 13 | WM_1BUTTONUP | 0.100 | 646 | 110 | 0 | 0 |
| | 13 | WM_MENUSELECT | 1.460 | 14 | ---- | 2 | 11 |

PANEL DEFINITION TABLE

| Object ID | Name |
|---|---|
| Obj001 | ( 30, 300) |
| Obj002 | (280, 300) |
| Obj003 | (280, 150) |
| Obj004 | (530, 150) |
| Obj005 | (530, 50) |
| Obj006 | (230, 300) |
| Obj007 | (480, 300) |
| Obj008 | (330, 230) |
| Obj009 | (480, 150) |
| Obj010 | (630, 100) |

PROCEDURE DEFINITION TABLE

| Procedure ID | Name |
|---|---|
| Pro001 | StorData |
| Pro002 | MakeGrph |
| Pro003 | WrtReprt |
| Pro004 | PasteRpt |
| Pro005 | PrintRpt |

BOX TABLE

| Object ID | Color | Label | Size |
|---|---|---|---|
| Obj001 | Gr. | INPUT DATA | 200, 50 |
| Obj002 | Ye. | MAKE GRAPH | 200, 50 |
| Obj003 | Gr. | MAKE REPORT | 200, 50 |
| Obj004 | Ye. | PASTE IN REPORT | 200, 200 |
| Obj005 | Ye. | PRINT | 200, 50 |

201

ARROW TABLE

| Object ID | Direction | Size |
|---|---|---|
| Obj006 | R | 50, 30 |
| Obj007 | R | 50, 30 |
| Obj008 | D | 30, 50 |
| Obj009 | R | 50, 30 |
| Obj010 | D | 30, 50 |

OBJECT OPERATION TABLE

PANEL TABLE

| Panel ID | Name |
|---|---|
| Pan001 | Procedure Panel |
| Pan002 | Print Panel |

~214

PROCEDURE DEFINITION TABLE

| Procedure ID | Name |
|---|---|
| Pro001 | StorData |
| Pro002 | MakeGrph |
| Pro003 | WrtReprt |
| Pro004 | PasteRpt |
| Pro005 | PrintRpt |

PANEL TRANSITION TABLE

| Tran. ID | Current Panel | Next Panel |
|---|---|---|
| Tr005 | Pan001 | Pan002 |

PROCEDURE INVOCATION TABLE

| Tran. ID | Proc. To Be Invoked |
|---|---|
| Tr001 | Pro001 |
| Tr002 | Pro002 |
| Tr003 | Pro003 |
| Tr004 | Pro004 |

FIG. 21

GRAPHICAL USER INTERFACE MANAGEMENT SYSTEM

This is a continuation of application Ser. No. 07/676,602 filed Mar. 28, 1991, now abandoned.

BACKGROUND OF THE INVENTION

1. Field of the Invention

The present invention is related to graphical user interface management systems, and in particular, it is related to those which enable a user to easily produce and manage objects of user interfaces by means of tables of a relational type.

2. Description of Related Art

One feature of programming in an object oriented language is that it uses a data abstract approach. The data abstract approach means a programming manner in which data expressions and operations to data are grouped together, and accesses to the data are allowed only from given interfaces of the operations. Data in a program is expressed with common data expressions and interfaces. With an object oriented language, frameworks for expressing common data are referred to as "classes." Objects are entities of data having configurations such as classes. Applications are written by definition of a plurality of classes, generation of objects, and operations to the objects. Another feature in programming in an object oriented language is that classes have a hierarchy which causes inheritance between an upper and lower classes. The above features allow higher level data modelling, and sharing and reuse of data types.

The use or definition of classes however requires the use of an object oriented language, and sharing and reuse of data types directed to a specific object oriented language cannot be used with other object oriented languages. Accordingly class definitions, as well as existing files prepared in another language, cannot be used in one language.

Currently, many user interface management system prototypes have been presented. A user interface toolkit, "Coral" (A User Interface Toolkit Based on Graphical Objects and Constraints, OOPSLA '88 Conference Proceedings pp. 37–45) by P. A. Szekely and B. N. Myers is a system which produces graphical objects on windows. Coral is written in an object oriented language (CLOS) which is based on LISP language. For users, features of Coral are:
1. A declaration language is prepared for the definition of graphical objects so that users can define objects.
2. A procedure language is prepared for the provision of constraints among objects so that users can set the constraints.

The generation of new graphical objects by users basically necessitates understanding by users of CLOS which gives the essence to Coral and the declaration language which Coral defines. Also the description of constraints among the objects necessitates understanding by users of CLOS and the procedure language. In view of building user interface management systems, features of Coral are:
1. Special variables are prepared for isolation between a portion, for display of graphical objects, and an execution portion which is invoked by the display portion.
2. Class sets are prepared for dealing with a plurality of graphical objects in a set.
3. Procedures for identifying objects which are pointed by input actions and modifications to data in the objects are defined within the objects.

The reason why specific variables and classes are needed with the above features 1 and 2 is that object oriented languages lack a concept of "relation." Consideration of specific variables and classes must be introduced during design. It is also reasonable, and complies with ideas of database systems, that the "object access" functions of the feature 3 should be provided outside of the objects, because the objects are considered as data holding means.

Another reference connected to the present invention is Japanese Published Unexamined Patent Application No. H1-229321, which discloses user interface generation tools which hold location information of objects in tables. However that reference does not suggest the use of tables of a relational type to enable queries of a plurality of tables simultaneously, nor does it disclose generation or management of graphical objects or procedure objects with tables directly.

SUMMARY OF THE INVENTION

Accordingly, an object of the present invention is to provide a system for easy generation and management of objects of graphical user interfaces without use of any object oriented language.

In accordance with the present invention, for solving the above problems, an object management system for graphical user interfaces includes: basic object storage means for storing one or more tables of a relational type each describing, as one or more basic objects, one or more graphical components displayed on a display apparatus, or one or more procedure modules or procedure module groups; complicated object storage means for storing one or more tables of a relational type each describing complicated objects relating one or more of said basic objects to one or more others of said basic objects; means for storing one or more tables of a relational type each describing, as one or more objects, one or more internal states of one or more application programs; and, control means for translating messages to said objects into formats of corresponding tables of said relational type, performing predetermined queries on said tables of said relational type, and performing invocations of procedure modules or procedure module groups determined by said queries.

DETAILED DESCRIPTION OF THE PREFERRED EMBODIMENT

Figure 1:
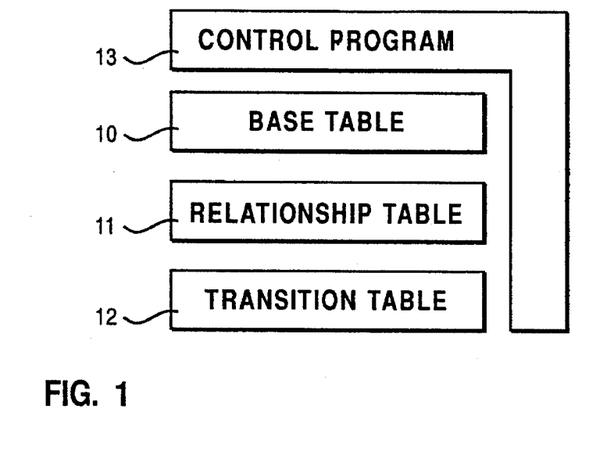
FIG. 1 is a block diagram generally illustrating one embodiment of the user interface management system according to the present invention.
Figure 13:
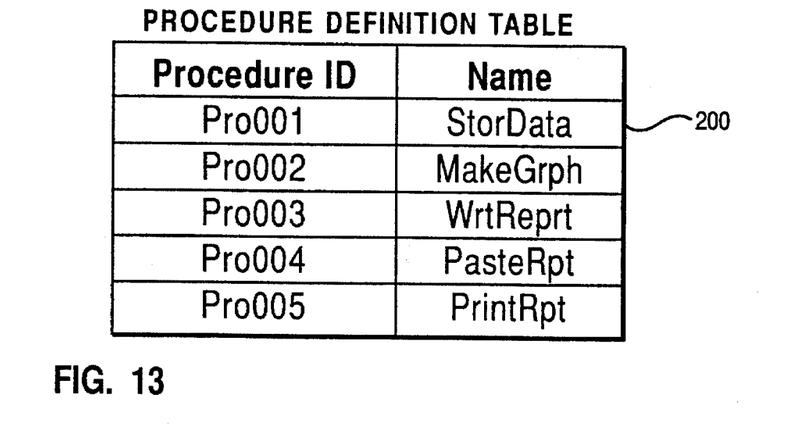
FIGS. 13, 14, 15, 16, 17 and 18 are drawings exemplifying the tables of a relational type used for the above embodiment.
Figure 14:
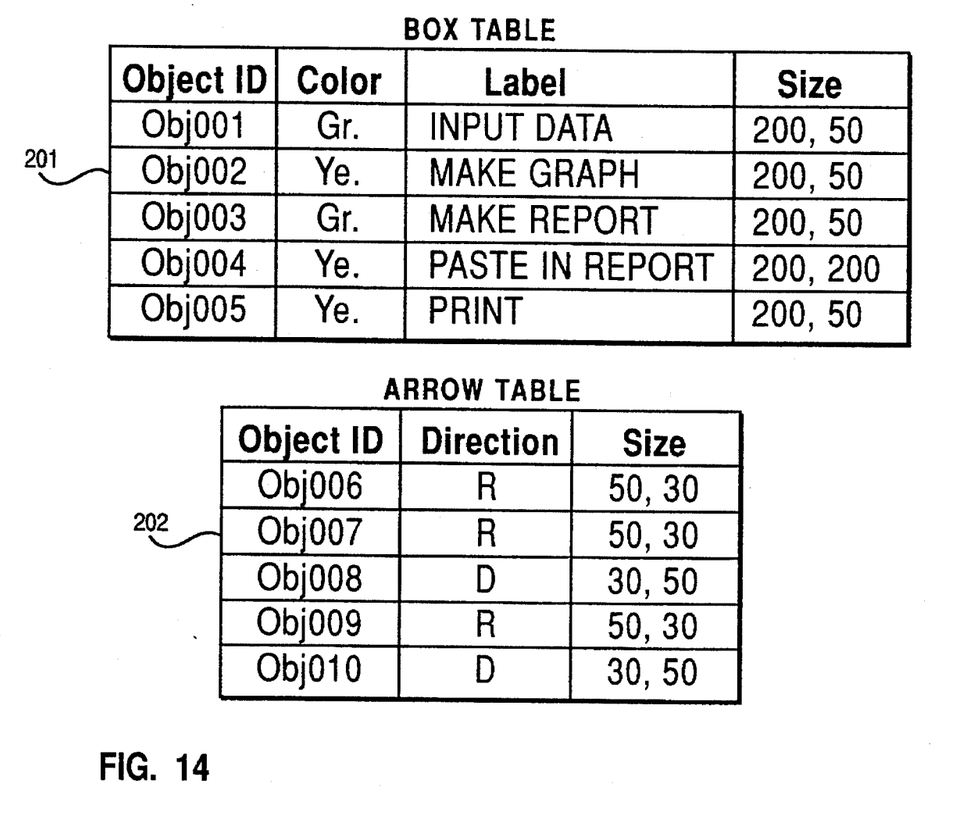

An embodiment will next be described wherein the present invention is applied to the management of objects used for a user interface of a programming environment system, which system enables a user to customize one or more applications and to produce a new application. The management architecture for the user interface objects of this embodiment is first illustrated by FIG. 1 which shows the object management architecture, comprised of a base table group 10, a relationship table group 11, a transition table group 12, and a control program 13. The base table group 10 has one or more base tables each describing one or more basic objects. The basic objects are for general purposes and do not depend on semantics of applications. Tables consisting of attributes of sizes, colors and so on for graphical objects such as rectangles and arrows are examples of base tables (Box table and Arrow table as shown in FIG. 14). Tables defining procedures in connection with graphical objects are other examples (Procedure definition table as shown in FIG. 13). Class variables and methods (or operations) of object oriented languages can be defined as attributes in tables in this architecture. There are two kinds of operations, that is, execution modules for calculation and for displaying objects, and operation modules for query of objects.

Figure 15:
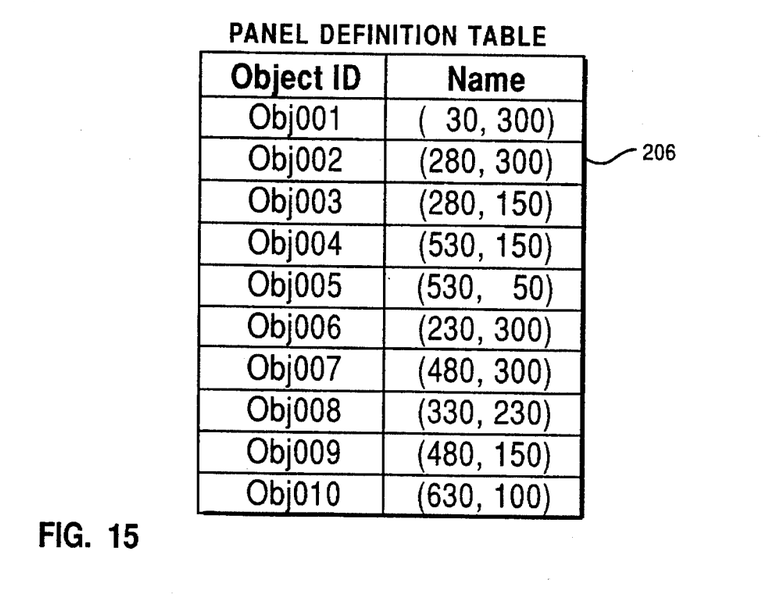

The relationship table group 11 is comprised of one or more relationship tables, which tables are used for defining complicated objects by use of objects defined by the base tables. The relationship tables are defined so as to comply with application semantics. Screens each having a plurality of graphical objects are, for example, defined by relationship tables (Panel definition table as shown in FIG. 15). For enabling navigation with a graphical object, another relationship table is used (Refer to query lines in Expressions 1, 2, and 3 described later). Since objects which do not depend on applications, and objects which depend on applications are respectively defined by base tables and relationship tables, and are divided from each other, user interfaces can be easily designed and modified.

Figure 21:
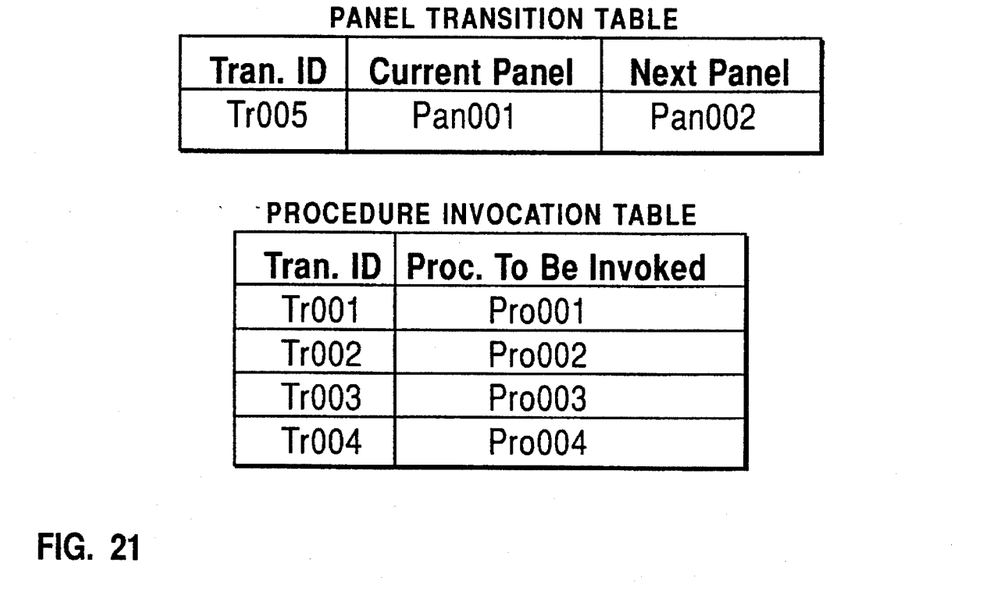

The transition table group 12 is comprised of one or more transition tables. The transition tables define transitions of internal states and panels of applications (Refer to Panel transition table in FIG. 21). A user action causes a transition from one state to the next, or one panel to the next, according to one of those tables.

Figure 18:
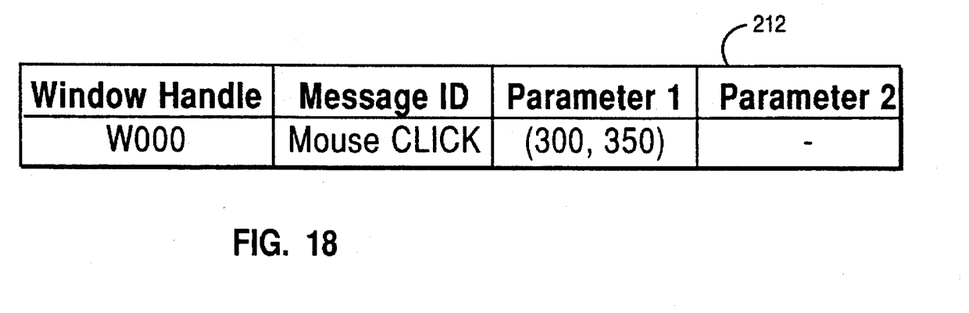

The control program 13 is designed for providing an interface between the aforementioned tables of a relational type and the outside. For example, the control program 13 converts a window message in the system queue into a table format, and accordingly keeps a corresponding conversion table (Window message table in FIG. 18). The control program 13 is also provided with a query function having tables of the relational type (Query lines in Expressions 1, 2, and 3, described later).

The invention is now described in detail with a specific programming environment system. The invention is in particular applied to the object management for a user interface of a user interface enabler (UIE) 103 of the programming environment system.

Figure 2:
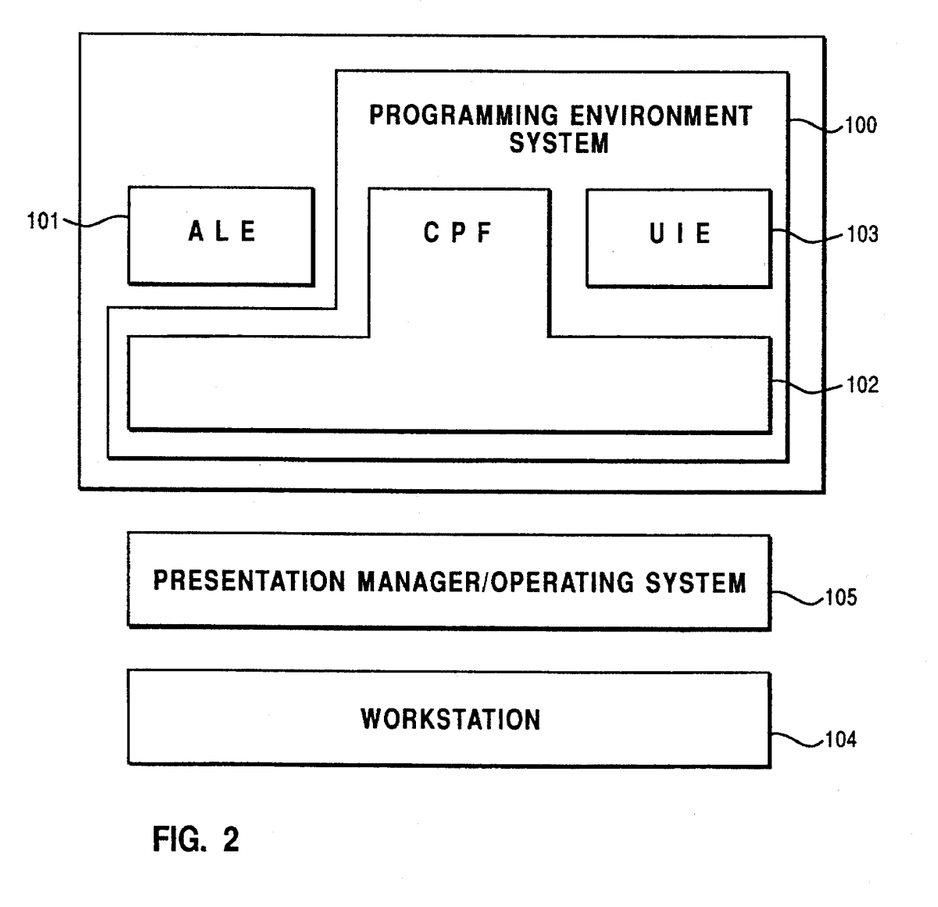
FIG. 2 is a block diagram illustrating as a whole a programming environment system which implements the user interface management system of FIG. 1.

FIG. 2 shows the overall configuration of a system on which the programming environment system 100 of the embodiment is implemented. In FIG. 2, the programming environment system 100 consists of an application logic enabler (ALE) 101, a customer programming facility (CPF) 102, and a user interface enabler (UIE) 103. The programming environment system 100 operates on a personal computing system, such as an IBM PS/2, Model 55 workstation 104 (IBM and PS/2 are trademarks of International Business Machines Corporation, U.S.A.), and is implemented in software on a system program 105 consisting of an operating system and a presentation manager for managing windows (hereinafter referred to as the presentation manager/operating system).

The ALE 101, provides existing application functions, and actually one or one set of applications on the presentation manager/operating system 105. The ALE 101 is desirable to provide as many functions as possible, and usually includes a package of general-purpose office applications, such as a spread sheet, a word processor, a data base manager, a calculator facility, a business chart facility and the like. Of course, special-purpose applications, such as the kernel of a knowledge-base system or an inference engine of a decision making environment system, may be employed if desired. For example, two or more applications on the IBM presentation manager are commonly used as the ALE 101. Such applications include a package of general-purpose office applications created by professional programmers, such as a spread sheet, a word processor, a data base manager, a calculator facility, and a business chart facility. Furthermore, the ALE 101 is so designed as to enable users to exchange data between these applications. The ALE 101 is thus enabled to provide various functions. When a window system of the SMART Series is used instead of the presentation manager, applications for the SMART Series are available. The SMART Series is a window-based system for supporting execution of applications.

The UIE 103 is a graphics editor that edits user interface layouts (screens). The present invention allows for the management of graphical objects on a user interface layout, newly generated by the UIE 103, and objects (event files and stories, which are described later) of procedure modules (logic modules) generated by the CPF 102, as described later.

The CPF 102 constitutes an essential part of the programming environment system of the present invention which allows users to customize the applications of the ALE 101 to constitute a new application, and to associate the new application with a new interface layout. Although the CPF 102 appears to the ALE 101 as if it were non-existent (i.e. transparent), the CPF actually controls the exchange of information between the presentation manager/operating system 105 and the applications of the ALE 101. The programming environment system 100 of the embodiment has a program mode (in FIG. 3) for customization, and an execution mode (in FIG. 4) for activating the customized environment. The program mode and the execution mode may be implemented by using a menu or key.

Figure 3:
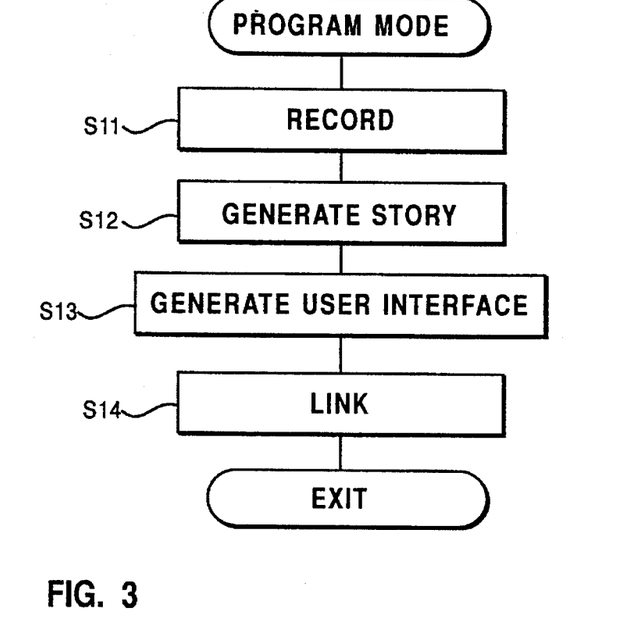
FIG. 3 is a flow chart illustrating operations of the programming environment system of FIG. 2 in a programming mode.

FIG. 3 is a flowchart of a program mode. The program mode is a mode to define tasks to be executed on applications before the execution of the tasks in the execution mode. As shown in FIG. 3, the user actually performs an operation on at least one program application, which is then recorded (S11). Such an operation is called "RECORD." A series of operations is saved as data called an event file. One or more saved event files may be used to produce data in the form of stories by a story editor 107 (in FIG. 5) capable of describing a control structure including loops and branches (S12). Both the event files and the stories are independently executable data. Next, a user interface is defined to direct tasks to be executed (S13). The user interface is produced by combining graphical objects, and is finally associated with event files or stories by an operation called "LINK" (S14). Each step will be detailed later in reference to the drawings from FIGS. 5–21.

Figure 4:
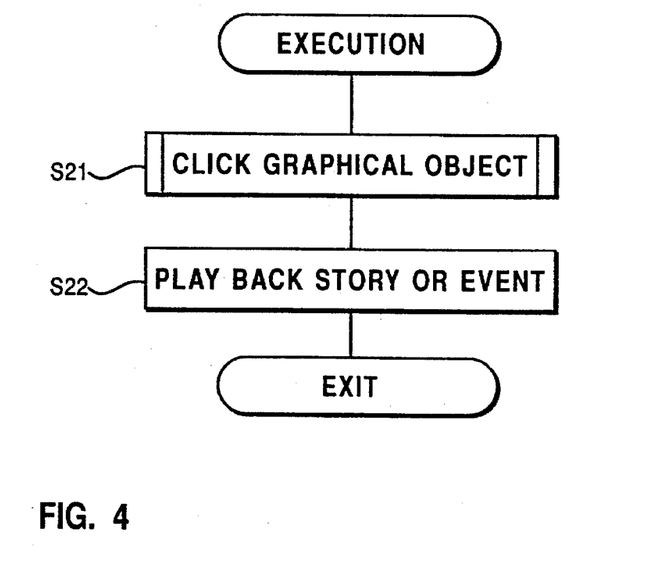
FIG. 4 is a flow chart illustrating operations of the programming environment system of FIG. 2 in an execution made.

FIG. 4 is flowchart of the execution mode. The execution mode is a mode to reexecute the recorded operations by utilizing the user interface customized in the program mode. As shown in FIG. 4, as the user clicks (selects using a keystroke, mouse, or the like) a graphical object on the screen (S21), an event file or story corresponding to the graphical object is activated (S22).

The following explains sequentially the respective parts of the programming environment system of the present invention.

Figure 5:
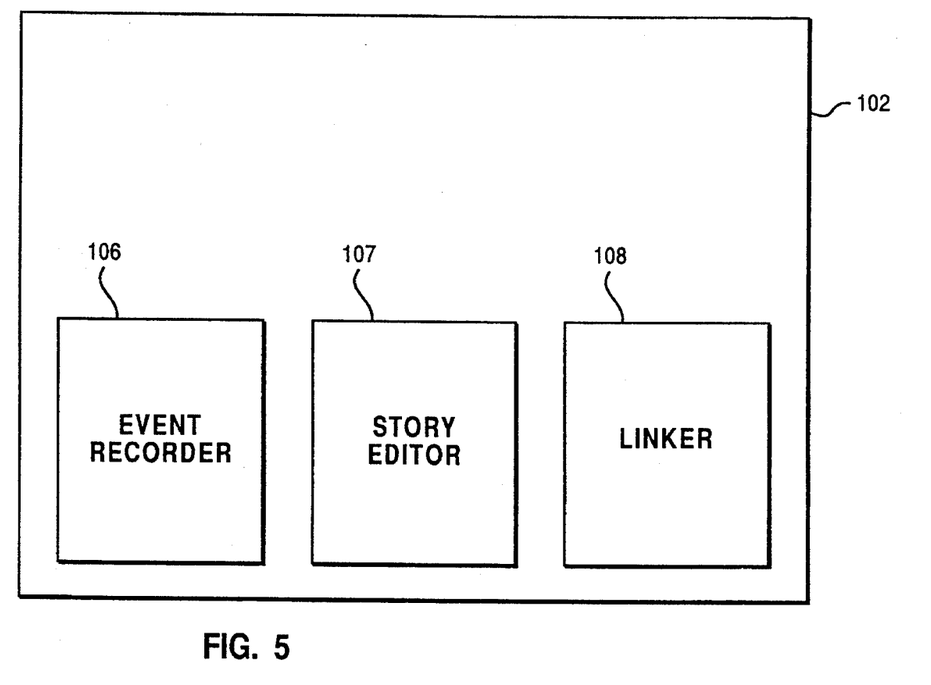
FIG. 5 is a block diagram illustrating the configuration of the customer programming facility (CPF) shown in FIG. 2.

FIG. 5 shows the configuration of the CPF 102. In FIG. 5, the CPF 102 includes an event recorder 106, a story editor 107, and a linker 108. The event recorder 106 records, as an event file, a sequence of events (interaction stream) entered in the program mode by a user as recorded, and reproduces them in the execution mode. The editor 107 supports the user in generating a set of event files, or a story, by combining those recorded event files. The linker 108 associates the event files or story with a graphical object on the newly generated user interface.

Figure 6:
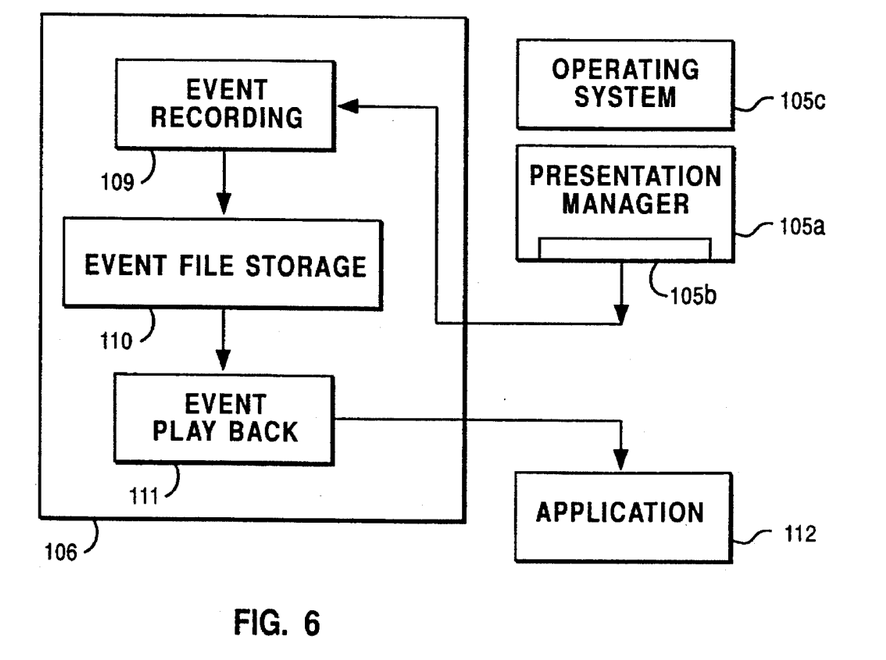
FIG. 6 is a block diagram illustrating the details of the event recorder shown in FIG. 5.

FIG. 6 shows details of the event recorder 106. In FIG. 6, the event recorder 106 consists of an event recording section 109, an event file storage 110, and an event play back section 111. The event recording section 109 functions to monitor and control application program interfaces, which an application program 112 uses to monitor a user's behavior. In this example, the event recording section monitors and controls information from the event queue 105b which is provided by the presentation manager 105a. That is, each time the application program 112 dequeues an event from the event queue 105b, the event recording section intercepts the event, and stores the sequence of events in the event file storage 110 as an event file. Strictly speaking, those events are intercepted by a function, called "input hook", provided by the presentation manager 105a. For details on the input hook, refer to "IBM Operating System/2 Programmer's Toolkit Version 1.1 Programming Guide", pp. 11–16 and pp. 11–18; (Operating System/2 is a trademark of IBM Corp.). In FIG. 6, the reference number 105c corresponds to the operating system.

Figure 7:
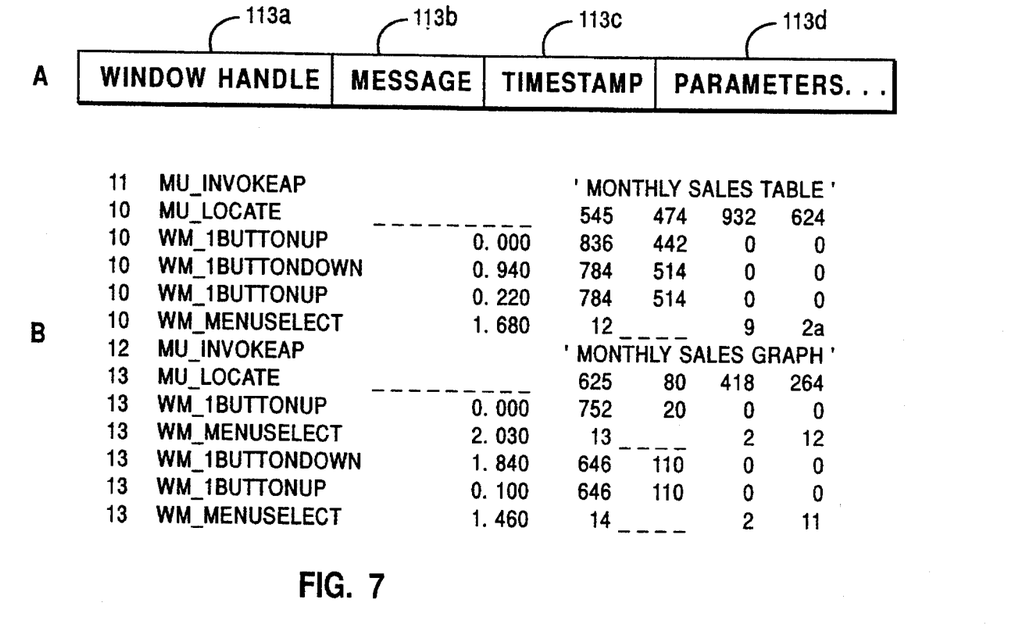
FIG. 7 is a drawing illustrating events to be dealt with by the event recorder.

FIG. 7 shows the structure (A) of an event to be recorded and examples (B), wherein direct events by a mouse or a keyboard, and events by the system such as the initiation of a menu, a window or an application are manipulated. This event information consists of a window ID (Window Handle) 113a, an event type (Message) 113b, and a time stamp (Timestamp) 113c, and other parameters (Parameters . . . ) 113d dependent on each message for meaning.

Referring now to FIG. 6, there is an event play back section 111, which reproduces those events stored in the event storage 110, in the play back mode. When the application program 112 is about to dequeue an event from the event queue 105b, the event play back section 111 transfers a corresponding event in the event file storage 110 to the application program 112 as if the event came from the event queue 105b. That is, the event play back section 111 reproduces such events by use of a send function for sending a message (WinSendMsg) that is one of functions provided to achieve an inter-application communication function and the like. For details on the function of WinSendMsg, refer to IBM Operating System/2 Programmer's Toolkit Version 1.1 Programming Guide, pp. 3–6 and pp. 3–8.

Figure 8:
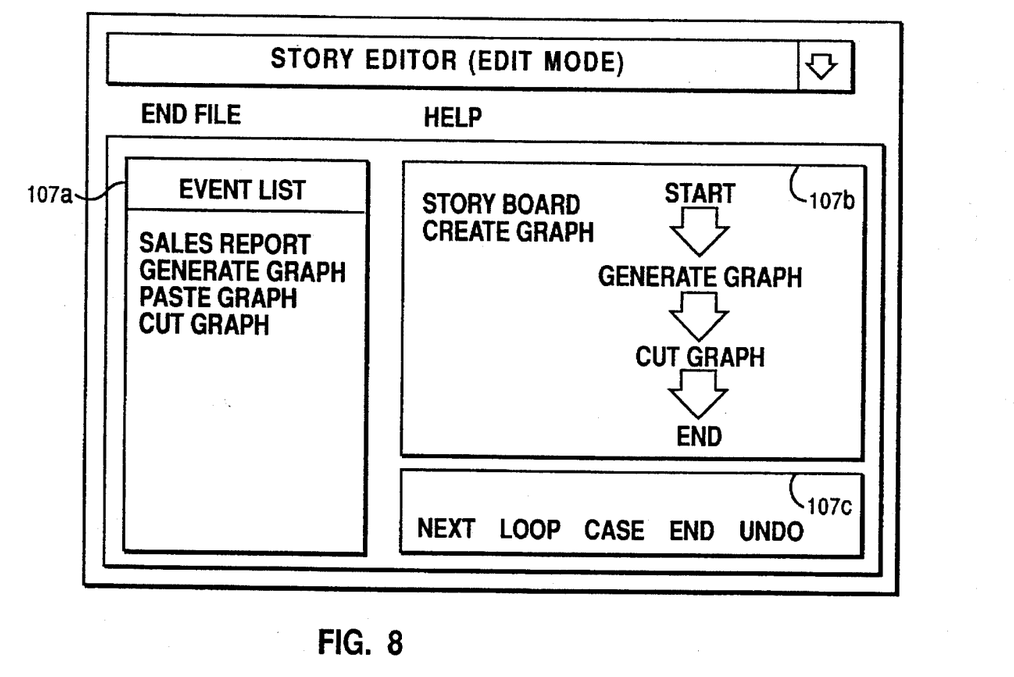
FIG. 8 is a drawing illustrating the operations of the story editor shown in FIG. 5.

FIG. 8 shows an example of a user interface screen of the story editor 107. As FIG. 8 shows, the story editor 107 provides fields of an event list 107a, a story board 107b, and commands 107c, and includes enables to edit events visually. The story editor 107 enables the present invention to handle more than one event file at once. The registered event files can be referred to on the event list 107a. The event files in the event list 107a are copied on the story board 107b with the commands 107c. One of the most important functions of the story editor 107 is to combine more than one event file into a larger executable record. Moreover, in a story the commands 107c, in the command field may be used to describe a control structure. In the following description, stories as well as event files are referred to as procedure modules. Stories are also held in the event file storage 110 in form of a relational type table 200 as shown in FIG. 13.

The linker 108 shown in FIG. 5 is designed to connect the graphical objects of the user interface and procedure modules so as to operate procedure modules in response to the corresponding operators to the user interface. The connection between the graphical objects and the procedure modules are established by the user, as described later, and the resultant connection is then stored in tables of a relational type, that is, the rational tables include object operation table 208 in FIG. 16 and the procedure invocation table 210 in FIG. 17, and query lines of Expressions 1, 2, and 3 which are described later. Those tables of a relational type and query lines are prepared and kept by using UIE 103, and the detailed description will be given together with UIE 103 below.

Next, the UIE 103 is explained. The UIE 103 is a graphics editor that defines a user interface. The display section is quite the same as a graphics editor of an ordinary WYSIWYG (What you see is what you get) type, so that users are allowed to use graphical components as they like in displaying a user interface. The functional part of this graphics editor is the layout editor 114, which a user may use to define the appearance of a new user interface for use in the future.

Figure 9:
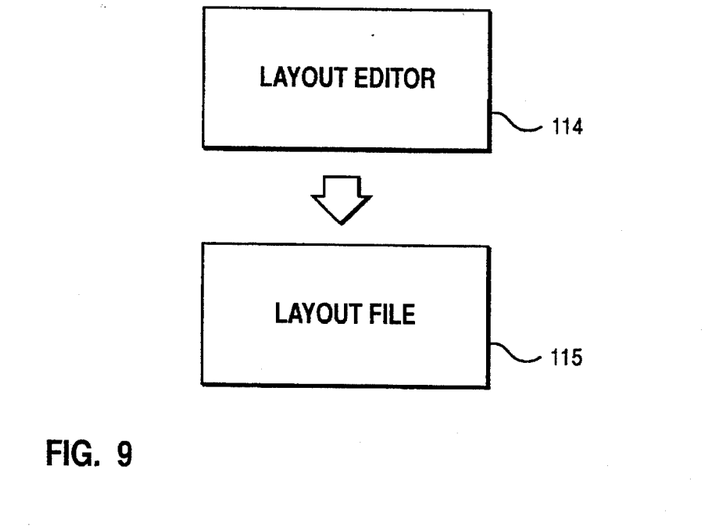
FIG. 9 is a drawing illustrating the configuration of the user interface enabler (UIE) shown in FIG. 2.
Figure 10:
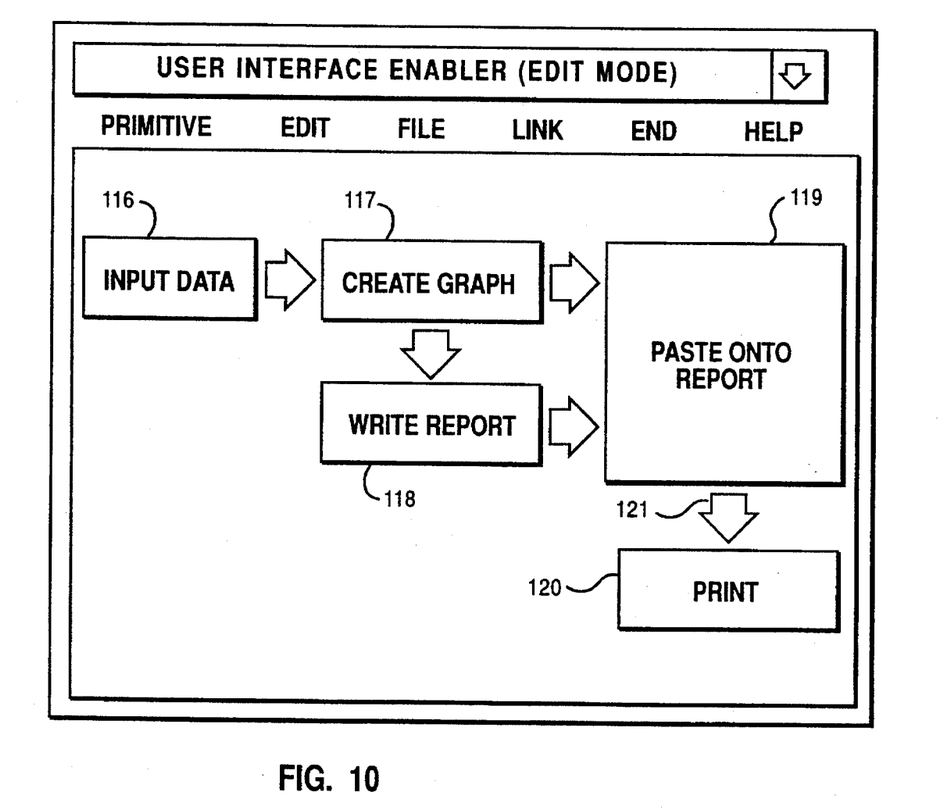
FIGS. 10, 11, and 12 are drawings illustrating the operations of the user interface enabler shown in FIG. 2.

FIG. 10 is an example of a layout generated by the layout editor 114. In this example, 116, 117, 118, 119 and 120 are graphical objects constituted by grouping character strings and rectangles. Each graphical object is called a layout object, which is associated with a procedure module. FIG. 10 shows an example of a process of office work from writing to printing of a report created by the UIE 103. The arrow 121 here is not associated with any procedure module, but only serves as a guide for operational procedures. (the arrow 121 may be associated with some procedure module, if necessary.) These definitions of graphical information are handled in the form of layout file 115 (FIG. 9) that is used for saving the user interfaces. The layout file 115 comprises the box and arrow tables (base tables 201 and 202, respectively) in FIG. 14 and the panel definition table 206 (relationship table) in FIG. 15.

Figure 11:
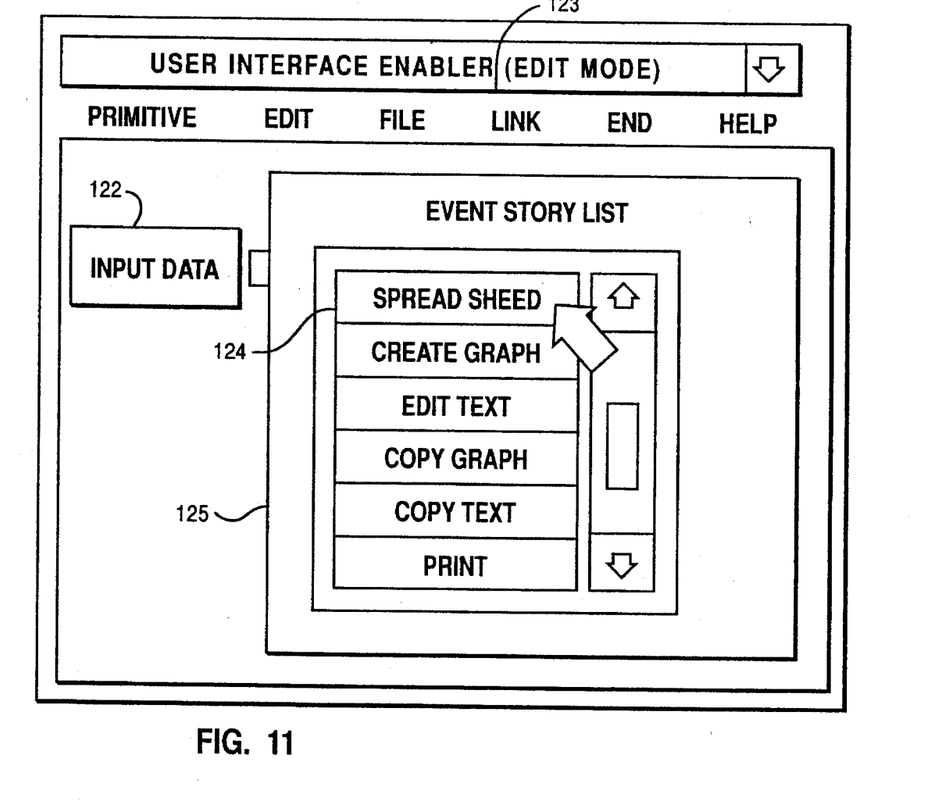
Figure 12:
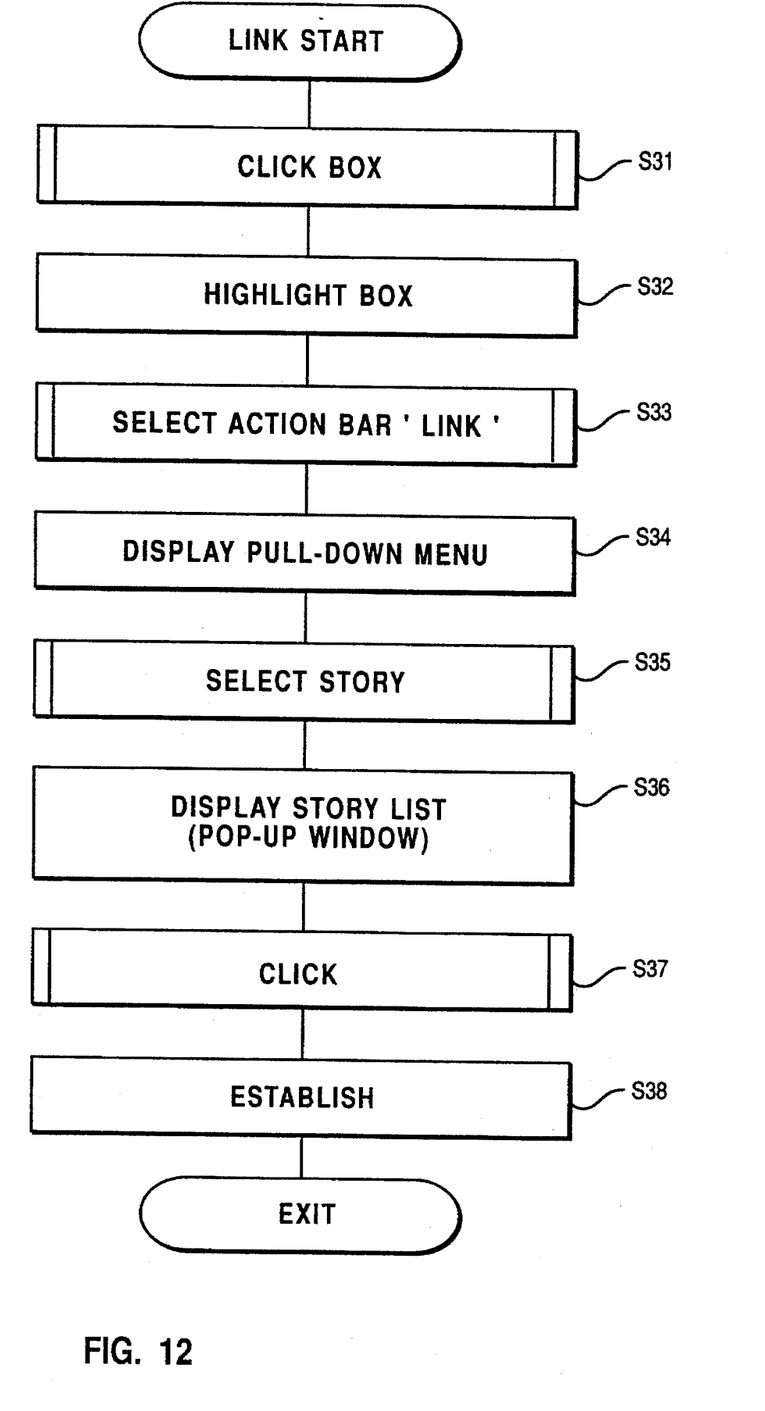
Figure 16:
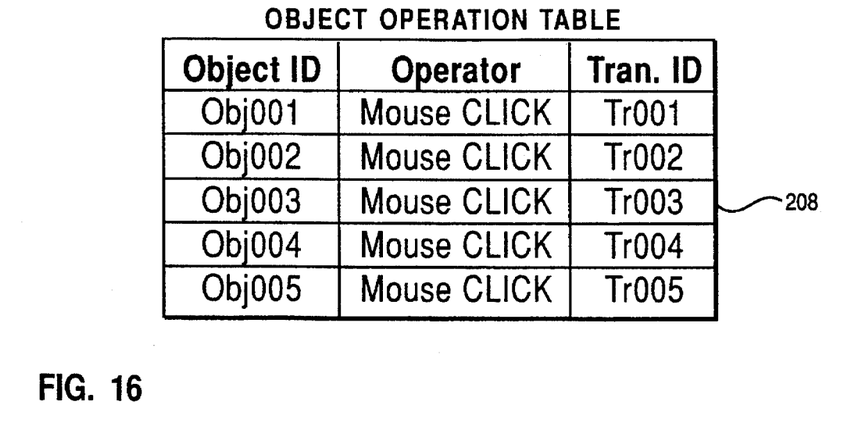

The following describes how to associate these layout objects with procedure modules. FIG. 11 is an example of linking, and FIG. 12 shows its procedure. Referring now to FIGS. 11 and 12, a particular graphical object 122 to be linked is first clicked (S31), whereby the graphical object is related to a required transition, as shown in table 208 of FIG. 16. On clicking one graphical object 122, one new tupple is added to the table 208 of FIG. 16. The transitions are ones of either internal states or panels of the application. The clicked object is highlighted so as to ensure the user to be informed (S32). In this connection, FIG. 16 illustrates which transition occurs upon providing a particular operator to a particular graphical object. In this example, a mouse click operation is a default parameter for operators.

Next, when the "LINK" action is selected on the menu 123 of the UIE 103 (S33), another menu 124 will appear to select "STORY" or "EVENT" (S34). In this example, the STORY is selected (S35), and a story list dialog box 125 then appears (S36). By selecting a required procedure module from the list with click (S37), a link is established (S38). Linking may be attained in a similar operation in the case where a link from the layout object is repasted to another procedure module. Furthermore, it is possible to automatically execute a procedure module associated with one layout object after executing another procedure module associated with another layout object by associating those layout objects with each other.

A user interface generated in this way has an appearance like that in FIG. 10, invokes a procedure module in response to a user's operation, supplies events sequentially to applications, and automatically executes the user's desired tasks. For example, when a mouse click action is provided on the object obj002, the control program operates as follows:
1. A window message is converted into an entity of the window message table 212 in FIG. 18.
2. The graphical object which is subjected to the mouse click action is searched, and the entity having "obj002" as the object ID is selected.

The function of the control program for this phase is described by the following pseudo code.
(Expression 1)
SELECT Object ID FROM Box Table OR Arrow Table
WHERE Parameter 1 of Window Message Table is inside the rectangle identified by the location of
Panel Definition Table and the size of Box Table 3. Since the combination of the selected graphical object and the input may cause a transition of the application, the object operation table 208 is checked for "obj002". In this case, a mouse click action for "obj002" is determined to raise the transition Tr002.

Figure 17:
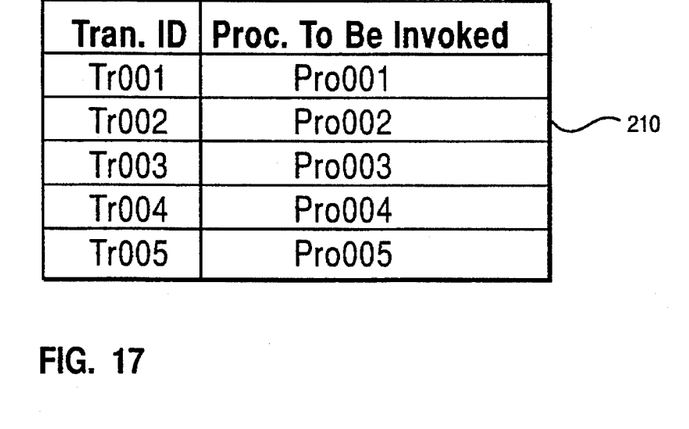

The function of the control program for this phase is described by the following pseudo code.
(Expression 2)
SELECT Transition ID FROM Object Operation Table
WHERE the operator of Object Operation Table=Message ID of
Window Message Table AND Object ID of Object Operation
Table=Object ID selected in Expression (1)
4. The procedure table 210 is consulted for determining what the selected transition is to do. Tr002 initiates the procedure Pro002.

Figure 19A:
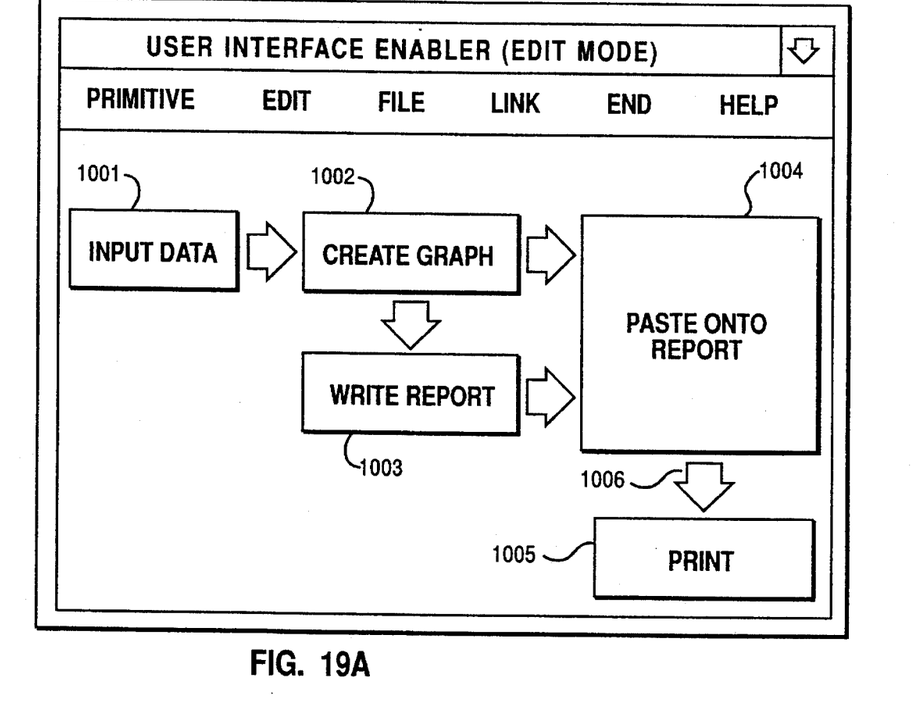
FIGS. 19, 20 and 21 are drawings illustrating a modified version of the above embodiment.
Figure 19B:
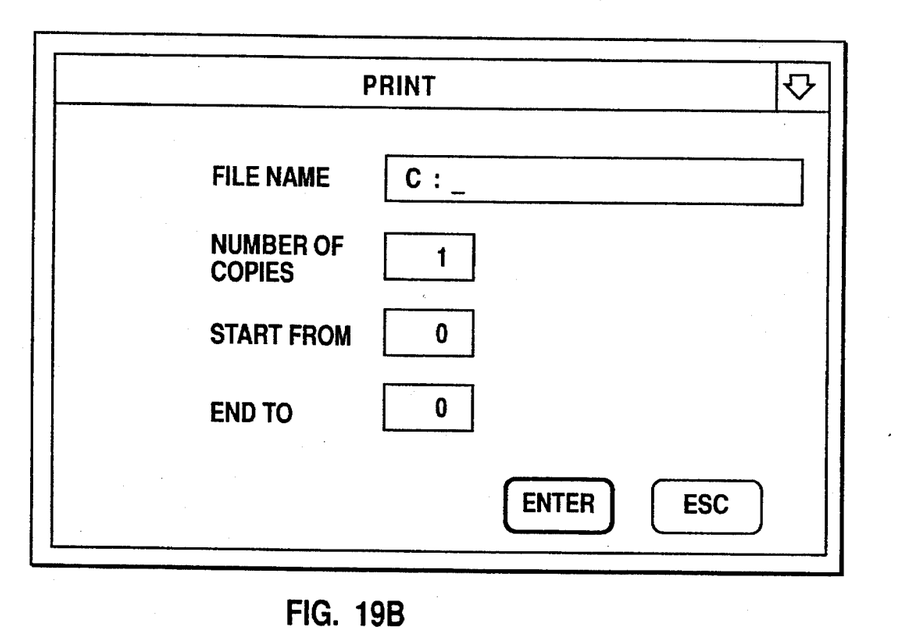
Figure 20:
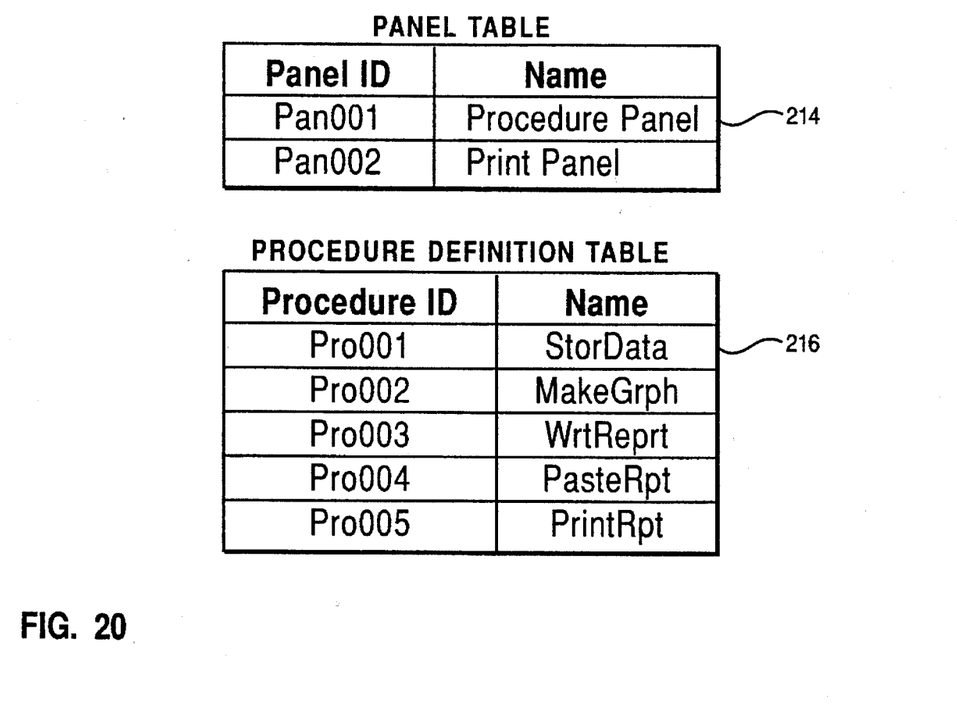

The function of the control program for this phase is described by the following pseudo code.
(Expression 3)
SELECT Invocation FROM Procedure Invocation Table
WHERE Transition ID of Procedure Invocation Table= Transition ID selected in Expression (2)
CALL Invocation just selected As understood from FIGS. 16 and 17, in the above example, the graphical objects to be clicked correspond to the procedure modules to be invoked one to one, and there is accordingly little need to describe and manage transitions among internal states of the user interface with regard to invocation of additional procedure modules. It is however critical to define the transitions and design a dynamic scenario of the user interface in connection to the generation or management of objects for a user interface. Besides, a user interface as shown in FIGS. 19a, 19b is required to describe and manage the internal states of the user interface. FIG. 19A shows graphical objects 1001, 1002, 1003, 1004, 1005, 1006, similar to those illustrated in FIG. 10. Additionally, while transitions correspond to procedure modules to be invoked one to one, graphical objects to be clicked do not necessarily correspond to procedure modules to be invoked on a one to one basis. In the example as shown in FIGS. 19A and 19B, a click action of the print box 1005 in the procedure panel causes a print panel window to open and enables input print parameters, and a click action of the mouse enter button on the print panel causes invocation of a print procedure. For the example of FIGS. 19A and 19B, a panel table 214 and a procedure definition table 216, illustrated in FIG. 20, are prepared as well as a panel transition table 218 and a procedure invocation table 220 illustrated in FIG. 21.

As described above, according to the present invention, by use of tables of the relational type, objects of use interfaces can be easily generated and managed. Although certain preferred embodiments have been shown and described, it should be understood that many changes and modifications may be made therein without departing from the scope of the appended claims.

What is claimed is:

1. A method of managing the interaction between a graphical user interface and a program application running on an information handling system, comprising the steps of:

recording operations performed by a user interacting with said program application to automatically create at least one procedure module in response to said recording;

storing said at least one procedure module in a relational data table;

storing at least one graphical object, to be displayed on a screen, in said relational data table;

relating said procedure module to said graphical object, thereby forming a connected relation therebetween; and executing, by said application, the procedure module to implement functions corresponding to said operations when the graphical object related to said procedure module is selected by said user.

2. A method according to claim 1 further comprising the step of storing transitional data, in a relational data table, for relating said object to other procedures to be invoked for execution by said application.

3. A method according to claim 2 wherein said step of associating comprises linking said graphical object to said transitional data by adding a new tupple to said stored transitional data.

4. A method according to claim 3 further comprising the step of providing a layout file for storing said connected graphical objects and procedural modules such that specific user interfaces can be saved.

5. A method according to claim 4 further comprising generating a graphical user interface, capable of invoking a procedure module in response to input from a user, based upon said saved specific user interfaces.

6. An information handling system for managing the interaction between a graphical user interface and a program application, comprising:

means for recording operations performed by a user interacting with said program application to automatically create at least one procedure module in response to said recording;

means for storing said at least one procedure module in a relational data table;

means for storing at least one graphical object, to be displayed on a screen, in said relational data table;

means for relating said procedure module to said graphical object, thereby forming a connected relation therebetween; and means for executing, by said application, said procedure module to implement functions corresponding to said operations when the graphical object related to said procedure module is selected by said user.

7. A system according to claim 6 further comprising means for storing transitional data, in a relational data table, and for relating said object to other procedures to be invoked for execution by said application.

8. A system according to claim 7 wherein said means for associating comprises means for linking said graphical object to said transitional data by adding a new tupple to said stored transitional data.

9. A system according to claim 8 further comprising a layout file for storing said connected graphical objects and procedural modules such that specific user interfaces can be saved.

10. A system according to claim 9 further comprising means for generating a graphical user interface, capable of invoking a procedure module in response to input from a user, based upon said saved specific user interfaces.

11. A system according to claim 6 further comprising:

means for translating messages input to said graphical objects into formats corresponding to the format of said relational data table;

means for performing predetermined queries on said relation data tables; and means for performing invocations of said procedure modules as determined by said queries.

12. A system according to claim 11 wherein said graphical objects include configuration and attribute data.

* * * * *